Aug. 18, 1959  J. MATTHEWS  2,899,822
TURBINE APPARATUS

Filed Aug. 8, 1957  2 Sheets-Sheet 1

INVENTOR
JENNIE MATTHEWS

BY Ralph T. French

ATTORNEY

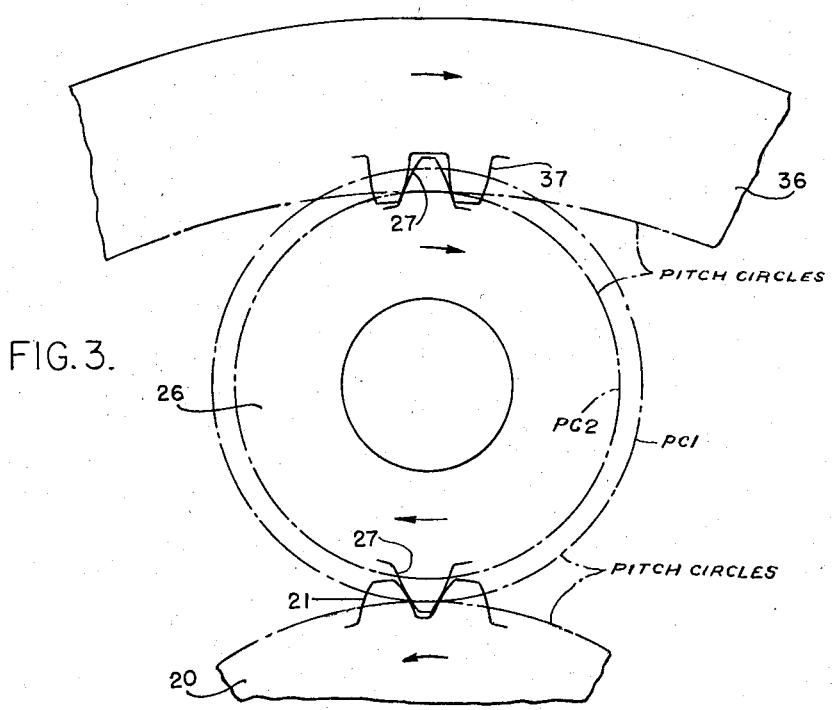
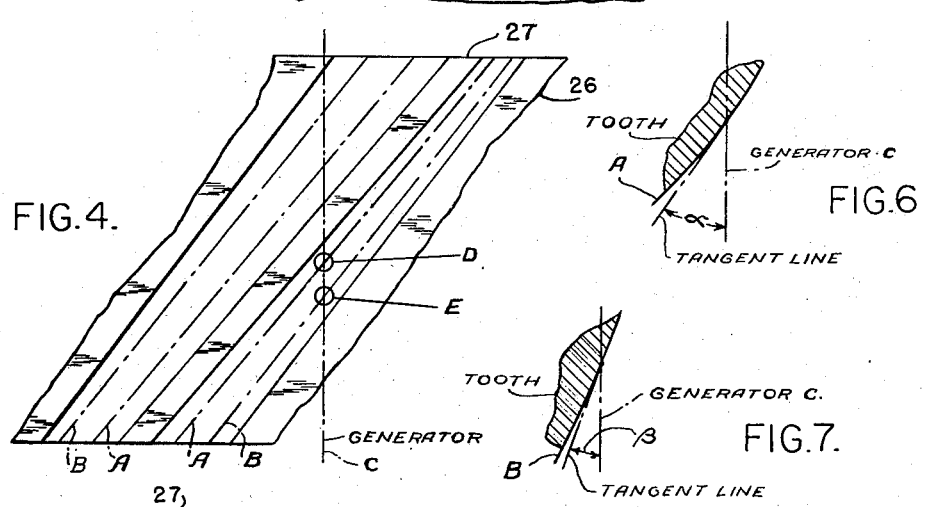
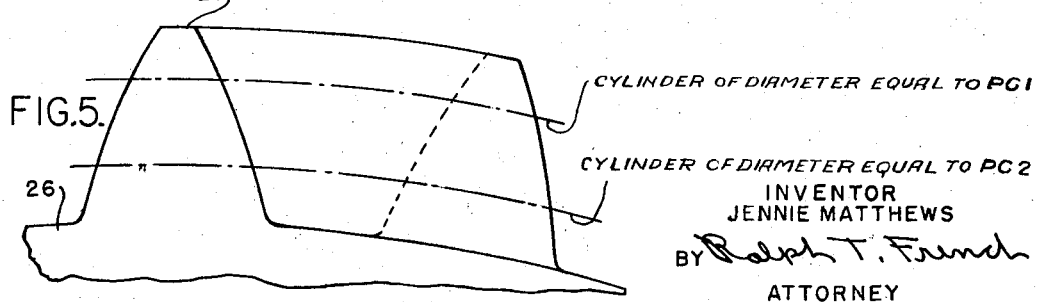

United States Patent Office 2,899,822
Patented Aug. 18, 1959

2,899,822

TURBINE APPARATUS

Jennie Matthews, Kansas City, Mo., assignor to Westinghouse Electric Corporation, East Pittsburgh, Pa. a corporation of Pennsylvania Application August 8, 1957, Serial No. 677,024

7 Claims. (Cl. 73—136)

This invention relates to a gear system, more particularly to an arrangement of gears for indicating the torque transmitted by the gear system, and has for an object to provide an improved gear arrangement.

The power transmitted by gears is proportional to the torque and speed thereof. The speed may be readily measured and the torque may be measured indirectly by first placing certain gears of the system under axial loads. These axial loads are proportional to the torque transmitted, and the axial loads are measured by providing an arrangement whereby the axial loads cause the gear shafts to move axially. The axial movement may be sensed by a suitable mechanism and is indicative of the torque transmitted when it is correlated to the shaft speed.

One embodiment of the present invention is utilized in a gear system which, in conjunction with an aviation gas turbine, drives a propeller. The main driving gear has helical teeth and is secured to a shaft driven by the turbine. Disposed around the periphery of the main gear and meshing therewith are a plurality of pinions having helical teeth and driven by the main gear. The pinions drive a ring gear which has internal helical teeth and is secured to the propeller shaft. The pinion gears mesh with the main gear along pinion pitch circles which are of greater diameter than the pinion pitch circles along which the pinion gears and the ring gear mesh. This arrangement causes axial thrusts upon the pinion gears due to the main gear which are larger than, and opposite in direction to, the axial thrusts imposed on the pinion gears by the ring gear. The differences in these thrusts, or net thrusts, cause the shafts to which the pinions are secured to tend to move axially. The axial movement, and thus indirectly the net thrust, of the pinion shafts is measured by a suitable mechanism including a means for resisting the axial movement of the shafts. Since the axial movement is proportional to the torque transmitted, the torque may be calculated by correlating this measurement to the speed of the pinion shafts.

The foregoing and other objects are effected by the invention as will be apparent from the following description and claims taken in connection with the accompanying drawings, forming a part of this application, in which:

Fig. 3 is a fragmentary view illustrative of the meshing of the gear teeth;

Figs. 4 and 5 are fragmentary enlarged views which illustrate one gear tooth; and Figs. 6 and 7 are fragmentary greatly enlarged sectional views showing, diagrammatically, portions of the gear tooth shown in Figs. 4 and 5.

Figure 1:
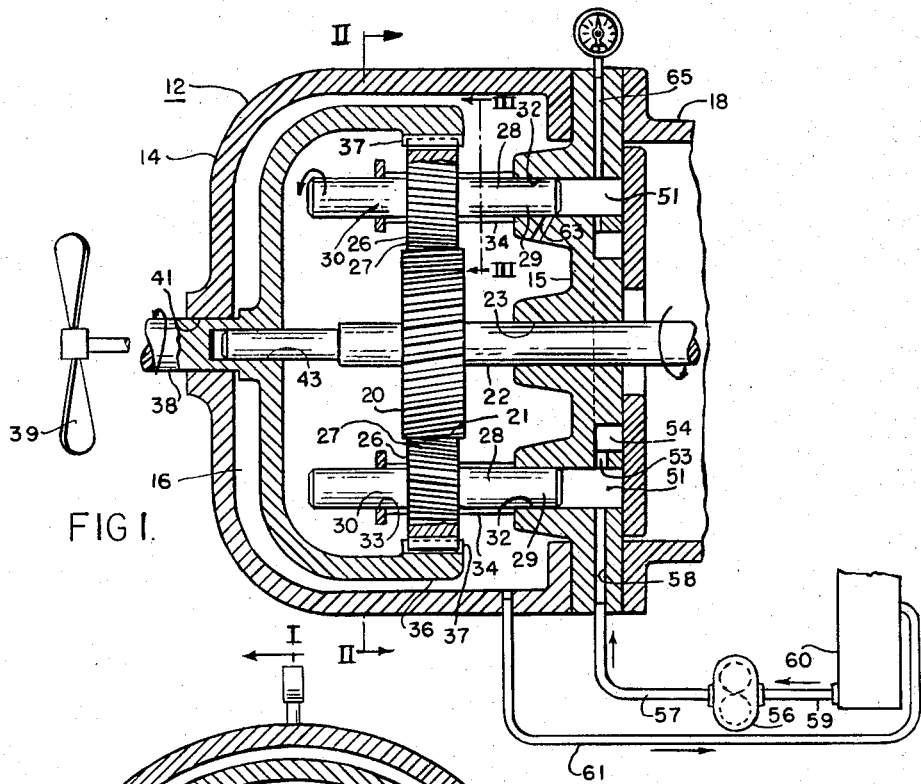
Fig. 1 is a longitudinal sectional view of a gear system incorporating the present invention taken along the line I—I of Fig. 2, and looking in the direction indicated by the arrows.
Figure 2:
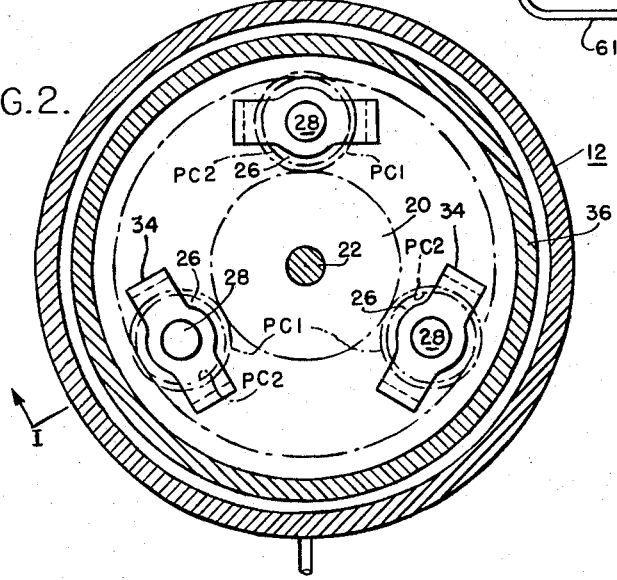
Fig. 2 is a cross sectional view taken along the line II—II of Fig. 1, and looking in the direction indicated by the arrows.

Referring to the drawings in detail, in particular to Figs. 1 and 2, there is illustrated a casing 12 including a cup shaped wall structure 14 and an end wall 15 which together define a chamber 16. The cup-shaped wall 14 may be connected to the end wall 15 by suitable devices (not shown) and the casing 12 may be suitably supported by a structure 18.

Within the chamber 16 is disposed a gear system comprising a main gear 20, having helical teeth 21, which is secured to a driving shaft 22 supported in a bearing 23 disposed in the end wall 15 of the casing. The shaft 22 is driven by an aviation gas turbine, disposed to the right as viewed in the drawing, but not illustrated since it forms no part of the present invention. Disposed around the periphery of the main gear 20 are a plurality of pinion gears 26 having helical teeth 27 meshing with the teeth 21 of the main gear 20. The pinions 26 are secured to layshafts 28 which have right hand journals 29 and left hand journals 30, as viewed in Fig. 1, rotatable and slidable in bearings 32 and 33, respectively. The bearings 33 are supported by arms 34 extending axially from the end wall 15.

The pinion gears drive a ring gear 36 which is provided with internal helical teeth 37 which mesh with the teeth of the pinion gears. The ring gear 36 is integral with a shaft 38 which drives a propeller 39 connected thereto. The shaft 38 is supported in a bearing 41 disposed in the cup shaped wall 14 and the shaft 38 includes a bearing 43 supporting an end portion of the shaft 22.

As indicated by Figs. 2 and 3, the main gear 20 and the pinion gears 26 mesh along pinion gear pitch circles PC1, which are of larger diameter than the pinion pitch circles PC2 along which the pinion gears 26 mesh with the ring gear 36.

As well known in the art, the helix angle of a helical gear tooth is defined as the angle between a tangent to the helix and a generator (line) of the cylinder upon which the helix lies. The magnitude of the helix angle of a helical tooth varies from the base to the tip of the tooth, being smallest at the base and largest at the tip; hence, the helix angle at PC2 is smaller than the one at PC1. In this instance, as indicated in Figs. 4 and 5, two cylinders are considered, one having a diameter equal to the pitch circle PC1, and the other cylinder having a diameter equal to the pitch circle PC2. In accordance with this invention, the different helical angles at the different diameters produce net axial thrusts upon the pinions, in a manner to be subsequently described, which cause the layshafts 28 to which they are secured to move axially.

Fig. 4 shows a diagrammatic top view of one of the pinion gear teeth 27 and Fig. 5 an end view. In Fig. 4, the longitudinal tooth form has been shown in straight lines, to simplify the figure, but in actuality the lines are helical lines and the dot dash lines represent imaginary lines A and B created by the intersection of the sides of the tooth with imaginary cylinders having diameters equal to the diameters of the pitch circles PC1 and PC2, respectively. The imaginary lines A and B on the sides of the tooth are intersected by a generator (line) C and two regions on one side are encircled and labeled D and E. Fig. 6 is an enlarged sectional view of the tooth 27 in the region D, and Fig. 7 is a similar view in the region E.

Fig. 6 shows the angle $\alpha$ between a line tangent to the imaginary line A at the point where it is intersected by the generator C. Fig. 7 shows the angle $\beta$ between a line tangent to the imaginary line B at the point where it is intersected by the generator C. As illustrated, the angle $\alpha$ is larger than the angle $\beta$.

It will be observed that the axial thrust upon one of the teeth 27 of the pinion gears 26 due to its meshing with one of the teeth 21 of the main gear 20 along the pitch circle PC1 is:

$$G = W \tan \alpha$$

where:

$G$ = axial thrust on the pinion tooth which meshes with the tooth of the main gear, in lbs.

$W$ = tooth load tangential to a cylinder through the pinion tooth at a diameter equal to the diameter of the pitch circle PC1, in lbs.

$\tan \alpha$ = tangent of the helix angle $\alpha$ (defined previously) of the gear tooth at a cylinder of a diameter equal to the diameter of PC1.

The axial thrust upon one of the teeth 27 of the pinion gears 26 due to its meshing with one of the teeth 37 of the ring gear 36 is:

$$H = W \tan \beta$$

where:

$H$ = axial thrust on the pinion tooth which meshes with the tooth of the ring gear, in lbs.

$W$ = tooth load tangential to a cylinder through the pinion tooth at a diameter equal to the diameter of the pitch circle PC2, in lbs.

$\tan \beta$ = tangent of the helix angle $\beta$ (defined previously) of the gear tooth at a cylinder of a diameter equal to the diameter of PC2.

With the shafts 22, 28 and 38 rotating in the directions indicated by the arrows in Fig. 1, the axial thrust G, to the right as viewed in Fig. 1, will always be larger than the axial thrust H, to the left, because the helix angle $\alpha$ is larger than the helix angle $\beta$. A net thrust to the right equal to G minus H will be imposed upon each of the pinion gears and the layshafts to which they are connected, tending to move the layshafts to the right, since they are free to move axially.

The bearings 32 include cylindrical cavities 51 in the right-hand ends, as viewed in Fig. 1. The cavities 51 are interconnected with one another by communcating passages 53 and 54 formed in the end wall 15. The journals 29 function as pistons which are axially movable, as well as rotatable, in the cavities 51. The cavities are fed with pressurized fluid supplied by a pump 56 through a conduit 57 and an inlet passage 58. The pump 56 is supplied by fluid delivered by a conduit 59 connected to a suitable source such as a tank 60. The fluid which works through the bearings collects in the bottom of the chamber 16 and is returned to the tank by a suitable conduit 61.

The upper cavity 51, as viewed in Fig. 1, is a control cavity in that it is provided with an aperture 63 which is axially disposed, so that the end of the upper journal 29 will just uncover the aperture 63 when the pinion gears 26 are substantially centrally located in the planes of the gears 20 and 36. Pressure in the cavities 51 may be measured by a suitable gauge in fluid communication with the cavities through a passage 65.

The pump 56 is chosen so that its capacity is sufficient to supply more than bearing leakage under the pressure conditions encountered in normal full load operation of the gear system. The fluid pressure in the cavities 51 acts upon the right-hand ends of the journals 29, tending to move them to the left. The upper journal uncovers the aperture 63 and fluid is bled from the upper cavity 51 until a pressure is established in all the bearing cavities equal and opposite to the net thrusts acting upon the layshafts; that is, the upper layshaft 28 automatically adjusts itself axially to modulate the open area of the aperture 63 in a manner to provide a pressure within the cavities 51 which will axially balance the then existing axial net thrusts on the layshafts 28. The axial forces due to the fluid pressure will, of course, be applied upon the right-hand ends of all of the layshafts 28, so that the fluid pressure on the layshafts will be exactly equal to the net thrusts. This pressure will be precisely proportional to the torque transmitted by the gear system and, accordingly, the gauge is an accurate indication of torque and may be calibrated in any appropriate manner.

From the foregoing it is evident that there has been provided a gear system in which the main helical gear drives helical pinion gears along certain pinion pitch circles and the pinion gears drive a helical ring gear along other pinion pitch circles. The difference in pinion pitch circle diameters results in net axial thrusts being imposed upon the pinion gears. These thrusts are sensed by a suitable mechanism, and when correlated to the speed of the pinion gears, indicates the torque being transmitted.

While the invention has been shown in but one form, it will be obvious to those skilled in the art that it is not so limited, but is susceptible of various changes and modifications without departing from the spirit thereof.

What is claimed is:

1. In a gear system, a first helical gear, a plurality of helical pinion gears spaced around said first gear and meshed therewith, said pinion gears being mounted on axially movable layshafts, bearings for said layshafts, a second helical gear meshed with said pinion gears, means for driving one of said first and second gears, said first gear and said pinion gears meshing along a first pitch circle of the pinion gears, said pinion gears meshing with said second gear along a second pitch circle of said pinion gears, said first pitch circle being of different diameter than said second pitch circle, said difference in pitch circle diameters being effective to induce net axial thrusts upon said pinion gears which cause said pinion gears to move axially, and means for opposing the net axial thrust of said pinion gears.

2. In a gear system, a main helical gear, a plurality of helical pinion gears spaced around said first gear and meshed therewith, axially movable layshafts on which said pinion gears are mounted, bearings for said layshafts, a ring gear having helical teeth meshed with said pinion gears, means for driving one of said main and ring gears, said main gear and said pinion gears meshing along a first pitch circle of the pinion gears, said pinion gears meshing with said ring gear along a second pitch circle of said pinion gears which circle is of different diameter than said first pitch circle, said difference in pitch circle diameters being effective to cause net axial thrusts to be imposed upon said pinion gears which causes said pinion gears to move axially, and means for measuring the net axial thrust of said pinion gears.

3. In a gear system, a main gear having helical teeth, a plurality of pinion gears having helical teeth spaced therearound and being meshed therewith, axially movable layshafts on which said pinion gears are mounted, bearings for said layshafts, a ring gear having helical teeth meshed with and driven by said pinion gears, said main gear and said pinion gears meshing along first pitch circles of said pinion gears at first helix angles, said pinions and said ring gear meshing along second pitch circles of said pinion gears at second helix angles, said first pitch circles having different diameters than said second pitch circles, said first helix angles being different than said second helix angles, the difference in helix angles and pitch circles producing a net axial thrust upon said pinions causing said pinions to move axially, and means for sensing the axial thrust of said pinions.

4. In a gear system, a first helical gear, a second helical gear meshing with said first helical gear, a third helical gear meshing with said second helical gear, one of said gears being axially movable, means for driving another one of said gears, means connecting the remaining gear to a load, said first and second helical gears meshing along one pitch circle of said second gear, thereby providing a first axial thrust, said one pitch circle being different from another pitch circle of said second gear along which said second and third helical gears mesh, thereby providing a second axial thrust of different value than said first axial thrust, and means for resisting the differential thrust of said first and second thrusts.

5. In a gear system, a first driving helical gear, a second helical gear meshing with and driven by said first helical gear, a third helical gear meshing with and driven by said second helical gear, said second gear being axially movable, and means connecting said third gear to a load, said first and second helical gears meshing along a first pitch circle of the second gear, said second and third helical gears meshing along a second pitch circle of said second gear, said first pitch circle being of different diameter than said second pitch circle, thereby producing a net axial thrust upon said second gear urging said second gear in an axial direction, and means resisting the axial movement of said second gear.

6. In a gear system, a first driving helical gear, a second helical gear, means connecting said second gear to a load, an intermediate helical gear disposed in meshing relation with said first and second helical gears, means supporting said intermediate gear for axial movement, said first and intermediate gears meshing along a first pitch circle of said intermediate gear, said intermediate and second gears meshing along a second pitch circle of said intermediate gear, said first and second pitch circles being of different diameter, thereby producing a net axial thrust upon said intermediate gear, and means for sensing said axial thrust.

7. In a gear system, a first driving gear with helical teeth, a pinion gear with helical teeth meshing with and driven by said first gear, said pinion gear being axially movable, a second gear with helical teeth meshing with and driven by said pinion gear, means connecting said second gear to a load, said first and second gears being substantially immovable in axial direction, said first and pinion gears meshing along a first pitch circle of the pinion gear, said pinion and second gears meshing along a second pitch circle of said pinion gear, said first pitch circle being of different diameter than said second pitch circle, thereby producing a net axial thrust upon said pinion gear, and means for sensing the axial thrust.

References Cited in the file of this patent

UNITED STATES PATENTS

| | | |
|---|---|---|
| 2,386,367 | Taylor | Oct. 9, 1945 |
| 2,518,708 | Moore | Aug. 15, 1950 |
| 2,684,591 | Lundquist | July 27, 1954 |